O. KJERGAARD.
GRAIN DRILL ATTACHMENT FOR COLTERS.
APPLICATION FILED AUG. 6, 1915.
1,176,906.
Patented Mar. 28, 1916.
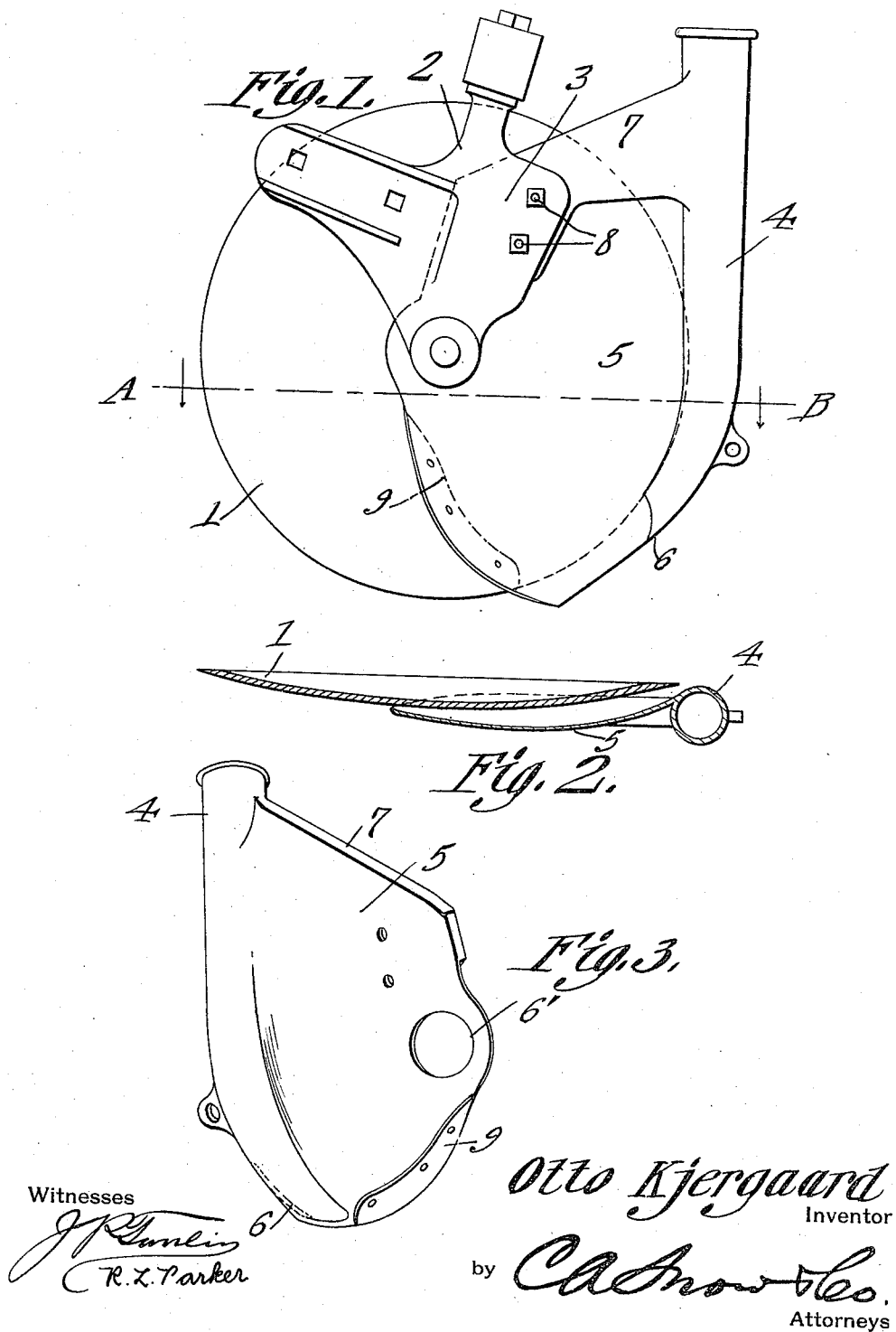
Witnesses
J. R. Gumlin
R. L. Parker
Otto Kjergaard
Inventor
by C. A. Snow & Co.
Attorneys

UNITED STATES PATENT OFFICE.

OTTO KJERGAARD, OF IRENE, SOUTH DAKOTA.

GRAIN-DRILL ATTACHMENT FOR COLTERS.

1,176,906.  Specification of Letters Patent.  Patented Mar. 28, 1916.

Application filed August 6, 1915. Serial No. 44,060.

*To all whom it may concern:*

Be it known that I, OTTO KJERGAARD, a citizen of the United States, residing at Irene, in the county of Clay and State of South Dakota, have invented a new and useful Grain-Drill Attachment for Colters, of which the following is a specification.

This invention relates to a grain drill attachment for use in connection with disk colters, one of the objects of the invention being to provide an attachment having a grain boot from which extends an integral guard plate adapted to be secured to the bearing of the colter, said guard plate constituting means for preventing corn stalks and rubbish from following the disk and clogging the structure and also means for scraping the colter disk and for preventing soil from falling into the furrow in advance of the deposited grain.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

In the accompanying drawings the preferred form of the invention has been shown.

In said drawings:—Figure 1 is a side elevation of the attachment connected to the bearing of a disk colter. Fig. 2 is a section on line A—B Fig. 1. Fig. 3 is a perspective view of the attachment.

Referring to the figures by characters of reference 1 designates a concavo-convex colter disk of the usual construction, the same being supported by a bearing casting 2 which may be connected to the frame of the planter in any manner desired. This casting has the usual wing 3 to which the boots of the drills are ordinarily attached.

The attachment constituting the present invention includes a boot 4 having an integral guard plate 5 which is of substantially segmental contour and the discharge end 6 of the boot is extended along the inner side of the plate 5, while an opening 6' is formed in said plate near its front end for the reception of the hub of the disk 1. This plate 5 has its upper portion reinforced or thickened, as shown at 7 and this reinforced portion is adapted to be fastened to the wing 3 by bolts 8 or in any other suitable manner. The lower front portion of the plate 5 is preferably curved as shown and has attached to it a scraping blade 9 adapted to engage the convex side of disk 1. If desired, the blade can be made integral with the plate 5.

As shown particularly in Fig. 2, the plate 5 is concavo-convex, the concave face being nearest the disk 1 so that the plate while acting as a scraper, also acts as a spreading means whereby grain discharged into the boot 4 will be delivered through the open lower end of the boot into the space formed between the convex side of disk 1 and the concave face of the plate 5.

By extending the plate 5 continuously to a point close to the top of the boot 4, it becomes impossible for any of the loosened soil to crowd over the upper edge of the plate and thus fall into the space between said plate and the disk 1. Consequently, none of the loosened soil will be deposited in the furrow in advance of the seed.

What is claimed is:—

1. The combination with a colter disk and a bearing member therefor, of a drill attachment including a guard plate extending rearwardly beyond the disk and having the lower portion of its rear edge substantially concentric with the periphery of the disk, said plate being secured to the bearing member, and a boot integral with and extending from the inner side of the plate along the rear edge thereof, said boot having an outlet opening in its lower end and close to the lower end of the back edge of the plate.

2. The combination with a colter disk and a bearing member therefor, of a boot extending back of the disk and terminating adjacent the bottom thereof, there being an outlet opening in the boot, a plate integral with the boot and lapping one side of the disk, the lower portion of the forward edge of the plate constituting a disk scraper, said plate being secured to the bearing member and having a thickened upper portion extending from said bearing member to the upper portion of the boot.

In testimony that I claim the foregoing as my own, I have hereto affixed my signature in the presence of two witnesses.

OTTO KJERGAARD.

Witnesses:
O. A. ANDERSON,
GRACE HALL.

Copies of this patent may be obtained for five cents each, by addressing the "Commissioner of Patents, Washington, D. C."